(No Model.)
C. E. BLAKE, Sr.
DENTAL FORCEPS.
No. 491,517. Patented Feb. 14, 1893.
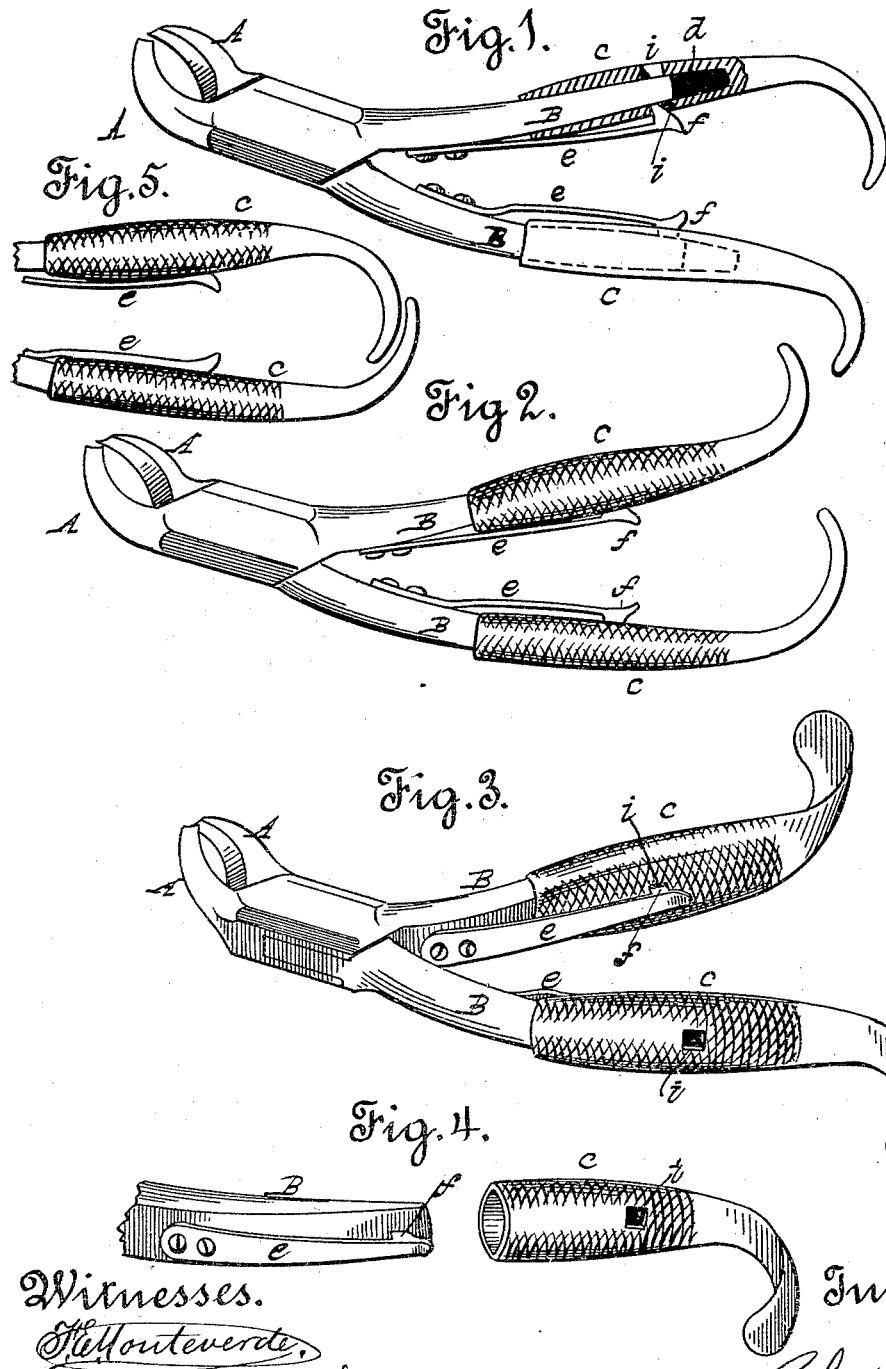

UNITED STATES PATENT OFFICE.

CHARLES E. BLAKE, SR., OF SAN FRANCISCO, CALIFORNIA.

DENTAL FORCEPS.

SPECIFICATION forming part of Letters Patent No. 491,517, dated February 14, 1893.

Application filed June 30, 1892. Serial No. 438,516. (No model.)

*To all whom it may concern:*

Be it known that I, CHARLES E. BLAKE, Sr., a citizen of the United States, residing in the city and county of San Francisco and State of California, have invented certain new and useful Improvements in Dental Forceps; and I do hereby declare the following to be a full, clear, and exact description of said invention, such as will enable others skilled in the art to which it most nearly appertains to make, use, and practice the same.

The object of my invention is to provide dental forceps with reversible and interchangeable handles, so that the grasp of the instrument can be changed from right to left, or for upper or lower teeth by simply shifting the handles into the proper relation to each other.

It consists in making each of the handles in two parts and separable, so that they can be connected or disconnected and reversed and shifted either on the same handle or on opposite handles, and be firmly and securely locked in whatever position they may be placed in.

Referring to the accompanying drawings Figure 1 shows a dental forceps, in which one handle shows a vertical section of the handle connection while the other handle shows the connection in dotted lines. Fig. 2 shows the two handles with end curves in the same direction. Fig. 3 shows the same handles with curves adjusted in opposite directions. Fig. 4 shows the parts of the joint connection when separated; and Fig. 5 shows them joined with bent ends adjusted inward.

Let A, represent any style of jaw or beak of a dental forceps. Each of the two handles of the forceps I make of two parts which telescope together, as represented plainly at Fig. 1. The inner part of B, of each handle forms a part of the body of the forceps, and instead of being shaped like a handle it forms a stub about two thirds the length of the ordinary handle. The outer part, c, of each handle is a shell, which is properly shaped like a handle of a forceps, and it has a socket, d, in its forward end, in which the stub end, B, of the forceps enters or telescopes about one half (more or less) of its length. A strong flat spring, e, is secured on the inside of each stub, B, near the joint of the forceps, and extends along inside the handle to near the end of the stub, and it has a hook or catch, f, at its extreme end. The shell or outer portion of the handle has a hole, i, in it on each side in the proper position to allow the hook or notch, f, at the end of the spring to snap in and hold the two parts together when the shell or outer handle is properly slipped into position over the stub. These parts and their construction are all plainly shown in the several figures of the drawings.

The outer or shell portion of the handle is cross hatched in the usual manner of cross hatching the handles of dental forceps, and the extreme outer ends are bent or curved to furnish the grasp or hold for the hand.

As the outer part of each handle is reversible and interchangeable on either stub, it can readily be seen what a number of changes and adjustments can be effected in an instrument. By simply shifting these handles the instrument can be converted from a right to a left hand forceps, or it can be adapted for either the upper or lower jaw, and various special adaptations can be effected to accommodate special and peculiar conditions and uses. Then by using removable and interchangeable beaks, such as have recently been introduced into the dental profession, a complete dentist's outfit can consist of one of these dental forceps, with reversible and interchangeable handles and a set of reversible and interchangeable beaks.

Having thus described my invention, what I claim, and desire to secure by Letters Patent, is—

1. The improvement in dental forceps, consisting in making the handles in two telescopic parts, which are interchangeable and reversible, and which are adapted to be locked in position when connected together, substantially as described.

2. In handles for dental forceps, a permanent short handle or stub B, having a spring, e, and hook or catch, f, and a tubular outer portion c, having openings i on either side to adapt it to be locked in place in either of its reversed positions, substantially as described.

CHAS. E. BLAKE, SR.

Witnesses:
THOS. J. STALEY,
J. WM. MISTER.